United States Patent
Harbers et al.

(10) Patent No.: US 6,406,172 B1
(45) Date of Patent: Jun. 18, 2002

(54) HEADLAMP AND DYNAMIC LIGHTING SYSTEM FOR VEHICLES

(75) Inventors: Gerard Harbers; Simon H. A. Begemann, both of Eindhoven (NL)

(73) Assignee: Koninklijke Philips Electronics N.V. (NL)

(*) Notice: Subject to any disclaimer, the term of this patent is extended or adjusted under 35 U.S.C. 154(b) by 0 days.

(21) Appl. No.: 09/599,792

(22) Filed: Jun. 22, 2000

(30) Foreign Application Priority Data

Jun. 25, 1999 (EP) .............................................. 99202054

(51) Int. Cl.[7] .............................................. F21V 29/00
(52) U.S. Cl. ........................ 362/544; 362/545; 362/230; 362/231; 362/464
(58) Field of Search ................................. 362/544, 545, 362/230, 231, 251, 464, 466

(56) References Cited

U.S. PATENT DOCUMENTS

| | | | |
|---|---|---|---|
| 5,136,483 A | * 8/1992 | Schoniger et al. | 362/545 |
| 5,570,951 A | * 11/1996 | Bertling et al. | 362/231 |
| 5,685,637 A | 11/1997 | Chapman et al. | 362/263 |
| 5,798,911 A | * 8/1998 | Josic | 362/466 |
| 5,876,113 A | * 3/1999 | Gotoh | 362/466 |
| 5,931,572 A | * 8/1999 | Gotoh | 362/466 |
| 6,220,722 B1 | * 4/2001 | Begemann | 362/231 |
| 6,234,648 B1 | * 5/2001 | Borner et al. | 362/235 |

* cited by examiner

Primary Examiner—Sandra O'Shea
Assistant Examiner—Ronald E. DelGizzi
(74) Attorney, Agent, or Firm—Dicran Halajian (57) ABSTRACT

A headlamp (2; 3) of a vehicle (1) has a light source (4; 5) comprising a plurality of opto-electronic elements (11; 12; 13; 14), preferably light-emitting diodes (LEDs). At least one of these opto-electronic elements (11; 12; 13; 14) has, in operation, a luminous flux of 5 lm or higher. According to the invention, the spatial distribution of the light beam (6, 6', . . . ; 7, 7', . . . ) generated by the light source (4; 5) is continuously adjustable. Preferably, the light source (4; 5) comprises opto-electronic elements (11; 12; 13; 14) only. Preferably, the spatial distribution is influenced by the speed of the vehicle (1), the rotational position of the steering wheel of the vehicle (1), the weather conditions, and it can also be influenced by the driver of the vehicle (1). Preferably, the spectral characteristics of the light beam (6, 6', . . . ; 7, 7', . . . ) generated by the light source (4; 5) depend on the position in the light beam (6, 6', . . . ; 7, 7', . . . ). The light beam comprises at least two light beam segments (6, 6'; 7, 7') having essentially different spectral characteristics.

24 Claims, 5 Drawing Sheets

HEADLAMP AND DYNAMIC LIGHTING SYSTEM FOR VEHICLES

CROSS REFERENCE TO RELATED APPLICATION

Applicants' application Ser. No. 09/599,792 filed Jun. 22, 2000 discloses related subject matter.

BACKGROUND OF THE INVENTION

The invention relates to a vehicle headlamp comprising a light source which includes a plurality of opto-electronic elements.

The invention also relates to a vehicle provided with a headlamp.

Such headlamps are used on vehicles, such as cars, trucks, buses, bicycles and on vessels and aircraft.

Vehicle headlamps are known per se. A vehicle headlamp generally comprises an electric lamp with an incandescent body, for example, in a halogen-containing inert gas (a so-called halogen lamp), or an electric lamp with a pair of electrodes in an ionizable gas (a so-called discharge lamp). Such headlamps are customarily built up of two light sources which, in operation, generate either a so-called passing beam or a so-called main beam. Vehicle headlamps are known wherein the light source for the passing beam and the light source for the main beam are housed in a single lamp vessel (the so-called H4). Other known vehicle headlamps are those wherein two types of light sources are used, for example a halogen lamp in combination with a discharge lamp. There are also headlamps which, in operation, generate colored light, which is generally brought about by a suitable coating provided on an outer surface of the lamp vessel. U.S. Pat. No. 5,685,637 discloses a vehicle headlamp wherein a halogen lamp is combined with a ring of light-emitting diodes (LEDs).

The known vehicle headlamp has the drawback that, in principle, it constitutes a static lighting system.

SUMMARY OF THE INVENTION

It is an object of the invention to provide a vehicle headlamp of the type described in the opening paragraph, which exhibits more dynamic lighting possibilities.

To achieve this, the vehicle headlamp is characterized in accordance with the invention in that a luminous flux of at least one of the opto-electronic elements amounts, in operation, to at least 5 lm, and in that a light beam generated by the light source has a continuously adjustable spatial distribution.

Opto-electronic elements, also referred to as electro-optical elements, for example electroluminescent elements, such as light-emitting diodes (LEDs) with a luminous flux of 5 lm or more can suitably be used as a light source for vehicle headlamps. A relatively high luminous flux is necessary to ensure that also under ambient light conditions, for example sunlight or light originating from headlamps of other vehicles, sufficient light is generated so that a light beam generated by the light source can be observed sufficiently clearly from a distance.

To generate a so-called passing beam and/or a so-called main beam, a conventional vehicle headlamp requires a luminous flux ranging between 600 and 1000 lm to meet internationally standardized and specified light beam intensities. Current technology of opto-electronic elements, particularly that of light-emitting diodes, has yielded two different material systems which can suitably be used for different regions of the visible spectrum, i.e. Al-In-Ga-N for blue-green light and Al-In-Ga-P for yellow-red light. As a result, any desired spectral characteristic can be produced by combining suitable light-emitting diodes.

The use of a plurality of opto-electronic elements with a relatively high luminous flux enables a vehicle headlamp to be manufactured having much more dynamic lighting possibilities than the known vehicle headlamp. The opto-electronic elements can be switched on and switched off, with the spatial distribution of the generated light beam depending on the conditions. Said conditions may be influenced by conditions outside the vehicle, the so-called external conditions. External conditions include, for example, the general lighting level (day or night situation), the shape of the road (width, number of bends), the weather conditions (bright weather, fog, rain, snow, etc.) and the velocity at which and/or the direction in which the vehicle is moving. Conditions which also influence the spatial distribution may be determined by conditions inside the vehicle, the so-called internal conditions. Internal conditions include, for example, the shapes of the light beam as set or desired by the driver.

In the description of the current invention, a light beam having a continuously adjustable spatial distribution is to be taken to mean that the opto-electronic elements can be switched on and off in such a manner that the light beam can assume various shapes, which shapes may demonstrate a partial overlap and may, more or less gradually, merge. The luminous flux of the opto-electronic elements may be changed with respect to each other. If a light beam is adjustable, also the intensity and/or spectral characteristic of the light beam, or of segments of the light beam, may be different.

Since the spatial distribution is (continuously) adjustable, the driver's view of the road and the surroundings of the vehicle is improved. On the one hand, objects situated on or in the axis of the light beam, such as oncoming traffic, can be better observed. On the other hand, also the observation of objects outside the center of the light beam is improved. This observation of objects outside the center of the light beam is also referred to as off-axis viewing, as opposed to the so-called on-axis viewing, which refers to the visibility of objects which are situated in the center, or in the immediate vicinity of the center, of the light beam. Examples of off-axis viewing include the observation of objects situated at or near the edge of the field of vision of the driver of the vehicle, for example the shoulder of the road, (unlit) objects, such as pedestrians or cyclists at the edge of the road on which the vehicle is traveling, and the observation of vehicles traveling on a road which crosses the road on which the vehicle provided with the headlamp in accordance with the invention is traveling.

The known vehicle headlamp has two light sources, namely a halogen lamp and a ring of light-emitting diodes, however, the halogen lamp produces a light beam of visible light and the LEDs emit infrared light at 880 nm. The individual light beams of the known vehicle headlamp are static in character and the light beam generated by the light source does not have a continuously adjustable spatial distribution.

An embodiment of the vehicle headlamp is characterized in accordance with the invention in that the light source consists of a plurality of opto-electronic elements. Consequently, the vehicle headlamp is composed of one type of light source. By combining LEDs or so-called multi-chip packages having a luminous flux in the range from 10–250 lm, the luminous flux of a suitable combination of 25 such elements, or fewer, preferably a combination of 15 such elements, or fewer, such as a combination of four such elements, meets the international standard ranging between 600 and 1000 lm. The dimensions of a vehicle headlamp comprising such a relatively small number of opto-electronic elements are comparable to the dimensions of a conventional vehicle headlamp. An additional advantage of the use of LEDs is that the service life of these opto-electronic elements is very long as compared to that of the conventional vehicle headlamp.

In a preferred embodiment of the vehicle headlamp in accordance with the invention, the spatial distribution of the light beam can be influenced by the velocity of the vehicle. In this manner, the range and the width of the light beam can be adjusted as a function of the velocity of the vehicle. At relatively low velocities, it is desirable for the light distribution of the light beam to be wider, so that, for example, also the shoulders of the road are illuminated. The higher the velocity of the vehicle, the longer the braking distance of the vehicle will be in general, so that it is desirable for the range of the light beam to increase. It may also be desirable for the width of the light beam to decrease and/or the intensity distribution between on-axis viewing and off-axis viewing to change. By switching on or off one or more opto-electronic elements at specific limiting values of the velocity of the vehicle, a continuously adjustable spatial distribution of the light emitted by the vehicle headlamp is obtained.

An embodiment of the vehicle headlamp is characterized in accordance with the invention in that the spatial distribution of the light beam can be influenced by the rotational position of a steering wheel of the vehicle. This enables the spatial distribution of the light beam of the vehicle headlamp to be adapted to the position of the steering wheel of the vehicle. The light beam "rotates" simultaneously, as it were, with the desired direction of movement of the vehicle. When the steering wheel is rotated it may be desirable for the intensity of the light beam shining in a straight line to decrease. By switching on or off one or more opto-electronic elements at specific limiting values of the rotational position of the steering wheel of the vehicle, a continuously adjustable spatial distribution of the light emitted by the vehicle headlamp is obtained.

In a favorable embodiment of the vehicle headlamp in accordance with the invention, the spatial distribution of the light beam can be influenced by the weather conditions. Under unfavorable weather conditions, in particular fog and snow, when the visibility is reduced by backscattering from fog or snow particles, the shape of the light beam can be adapted by activating different combinations of opto-electronic elements and by changing the output levels of the different opto-electronic elements. As a result of these adaptations, the overall spatial distribution of the light is changed.

An embodiment of the vehicle headlamp is characterized in accordance with the invention in that the spatial distribution of the light beam can be influenced by a driver of the vehicle. This enables the spatial distribution, for example the range and/or the width of the light beam, to be adjusted by the driver. As a result of information regarding, for example, the road type (for example a relatively narrow country road or a broad multi-lane motorway), the presence of bends and the possibility of oncoming traffic, it becomes desirable to make the light distribution driver-adjustable. On a country road, it is desirable to have a relatively broad light distribution of the light beam, so that also the shoulders of the road are clearly illuminated. On a motorway, where it is likely that there will be oncoming traffic, the degree to which the vehicle headlamp dazzles should not be too high, which is achieved in that the driver adjusts the light beam so as to be relatively narrow.

An alternative embodiment of the vehicle headlamp is characterized in accordance with the invention in that the spectral characteristic of a light beam generated by the light source depends upon the position in the light beam. By making the spectral characteristic of the light beam generated by the light source dependent on the position in the light beam, objects situated outside the center of the light beam can be better observed. Preferably, the light beam comprises at least two beam segments having a substantially different spectral characteristic. In general, the intensity of the light beam emitted by a vehicle headlamp decreases as a function of the position in the light beam, i.e. the intensity is maximal in the center of the light beam and gradually decreases in the direction of positions situated at a larger distance from the center of the light beam. As a result, the intensity of the light for so-called on-axis viewing is relatively much higher than for the so-called off-axis viewing.

It is well-known that the sensitivity of the human eye changes with the wavelength of the light and that equal quantities of energy of different wavelengths generally cause different sensations of brightness. In other words, if we consider a spectrum, and the received energy (per unit of time) is equal for all wavelengths, the middle of the visible region will apparently be brighter than the red and the blue ends. If the intensity of the light is relatively high (luminous efficiency $\geq 3.5$ cd/m$^2$), the maximum of the brightness lies at a wavelength of 555 nm (green/yellow), the so-called photopic eye-sensitivity curve. At this wavelength, particularly the cones are active in the human eye. If the intensity of the light is relatively low (luminous efficiency $\leq 0.035$ cd/m$^2$), the maximum of the brightness lies at a wavelength of 507 nm (blue/green or cyanblue), the so-called scotopic eye-sensitivity curve. At this wavelength, particularly the rods are active in the human eye.

It is advantageous to bring about substantially different spectral characteristics of the light beam for the on-axis and the off-axis parts of the light beam. In particular, in the off-axis parts of the light beam, the spectral characteristic of the light is adapted to a light intensity which is relatively low. By thus making the spectral characteristic of the light beam generated by the light source dependent upon the position in the light beam, the visibility of objects situated outside the center of the light beam is improved.

It is noted that, in practice, also photopic and scotopic light beams preferably have a broad spectrum, which light beams both have a more or less "white" appearance. The difference between a photopic and a scotopic light beam corresponds, as it were, to a difference between a light beam having a high and a low color temperature.

There is a possibility that the above-mentioned beam segments may comprise segments demonstrating a partial overlap. A possibly non-continuous transition between the beam segments may be perceived as unpleasant by the driver of the vehicle.

Preferably, a first beam segment has a spectral characteristic which is rich in green-yellow light, and a second beam segment has a spectral characteristic which is rich in blue-green light. On the one hand, in the on-axis part of the light beam (the first beam segment) a spectral characteristic of the light is presented which is adapted to the photopic eye-sensitivity curve, i.e. rich in green-yellow light. On the other hand, in the off-axis parts of the light beam (the second beam segment) a spectral characteristic of the light is presented which is adapted to the scotopic eye-sensitivity curve, i.e. rich in blue-green light.

These and other aspects of the invention will be apparent from and elucidated with reference to the embodiments described hereinafter.

BRIEF DESCRIPTION OF THE DRAWINGS

These Figures are purely diagrammatic and not drawn to scale. Particularly for clarity, some dimensions are exaggerated strongly. In the Figures, like reference numerals refer to like parts whenever possible.

DETAILED DESCRIPTION OF THE PREFERRED EMBODIMENT

Figure 1A:
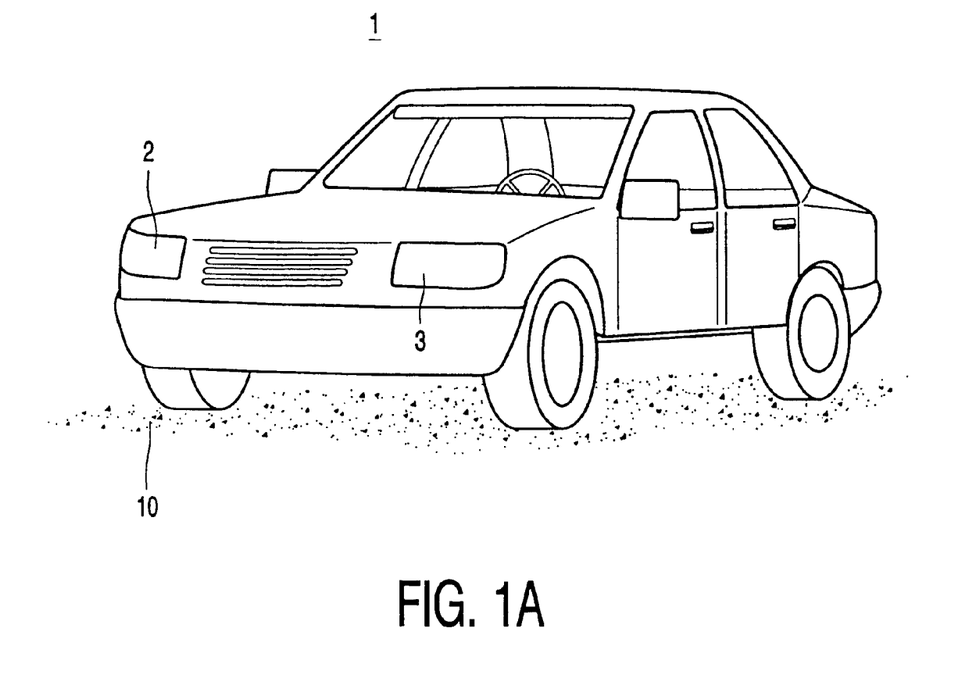
FIG. 1A is a perspective view of a vehicle provided with a headlamp in accordance with the invention.
Figure 1B:
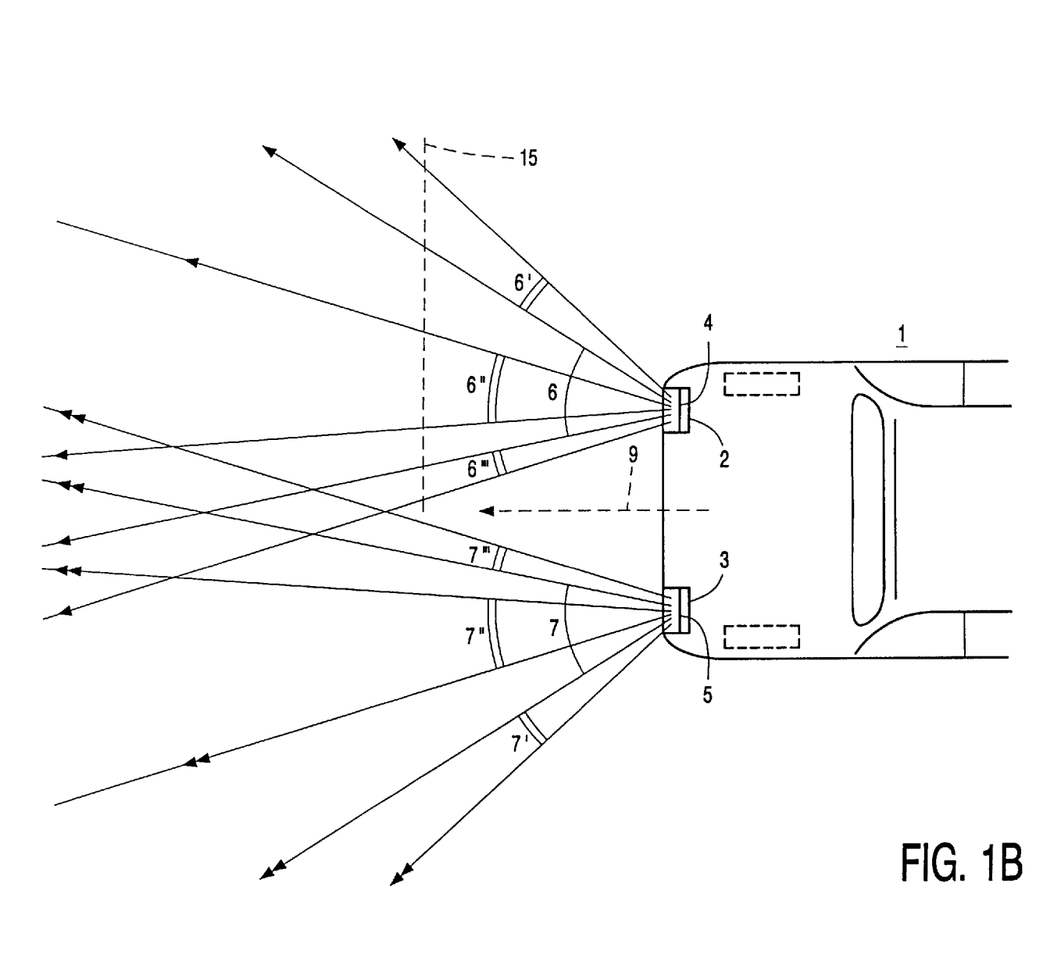
FIG. 1B is a plan view of a part of the vehicle shown in FIG. 1A.

FIG. 1A is a very diagrammatic, perspective view of a vehicle 1 situated on a road 10 and provided with a headlamp 2; 3 in accordance with the invention. FIG. 1B is a diagrammatic, plan view of a part of the vehicle 1 shown in FIG. 1A. Each one of the vehicle headlamps 2; 3 is provided with a light source 4; 5, which emits (diverging) light beams 6, 6', . . . ; 7, 7', . . . in a longitudinal direction 9. FIG. 1B further shows an imaginary screen 15 for trapping the light emitted by the light beams 6, 6'. In accordance with the invention, the spatial distribution of the light beams 6, 6', . . . ; 7, 7'. . . generated by the light source 4; 5 is continuously adjustable.

In the example shown in FIG. 1B, each one of the light beams originating from the light source 4; 5 of the vehicle headlamp 2; 3 is subdivided into four beam segments 6, 6', 6", 6'''; 7, 7', 7", 7''', namely in:

- a first beam segment 6; 7 comprising a relatively wide, central part of the light beam, which first beam segment 6; 7 comprises a kind of passing beam;
- a second beam segment 6', 7' comprising a part of the light beam which is directed in particular towards the edge of the road (the shoulder of the road);
- a third beam segment 6"; 7" comprising a relatively narrow part of the light beam, which is directed particularly towards the center of the road, and the direction of which may be dependent upon the rotational position of the steering wheel of the vehicle;
- and a fourth beam segment 6'''; 7''' comprising a relatively narrow central part of the light beam, which fourth beam segment 6'''; 7''' comprises a kind of main beam, the spectral characteristic of the fourth beam segment 6'''; 7''' differing substantially from the spectral characteristic of the other beam segments 6, 6', 6"; 7, 7', 7".

The light beams may also be composed of more than four beam segments, for example five or more beam segments having different spatial distributions and/or different spectral characteristics. In general, the light originating from two or more beam segments demonstrates an overlap. Partly because of the generally diverging character of the light beams, overlap between the various beam segments 6, 6', 6", 6'''; 7, 7', 7", 7''' is unavoidable.

Figure 2:
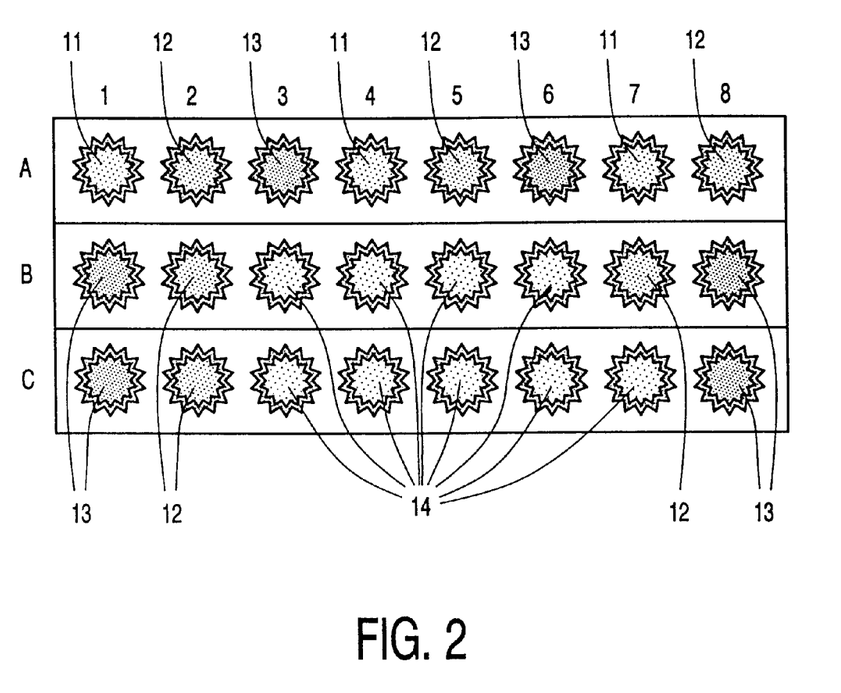
FIG. 2 is a sectional view of a light source comprising a plurality of opto-electronic elements arranged in accordance with a regular pattern.

FIG. 2 is a sectional view of the light source 4 comprising a plurality of opto-electronic elements 11; 12; 13; 14 which are arranged in accordance with a regular pattern. Similarly, a plurality of opto-electronic elements may be provided in the light source 5 (not shown). The pattern in which the opto-electronic elements are arranged in light source 4 may differ from that in light source 5. For example, for reasons of symmetry, the pattern in which the opto-electronic elements are arranged in the light source 5 may be mirror-inverted with respect to that in light source 4. In addition, the number of opto-electronic elements 11; 12; 13; 14 in light source 4 does not have to be equal to that in light source 5. The array of opto-electronic elements 11; 12; 13; 14 does not have to be provided on a flat substrate, it may alternatively be provided on a curved substrate. The shape of the substrate on which the array of opto-electronic elements 11; 12; 13; 14 is provided is determined to a substantial degree by the desired direction of the light beams emitted by the various opto-electronic elements 11; 12; 13; 14.

In accordance with the invention, the luminous flux of at least one of the opto-electronic elements 11; 12; 13; 14 is at least 5 lm, in operation. Preferably, in operation, all opto-electronic elements 11; 12; 13; 14 have a luminous flux above 5 lm. Preferably, the vehicle headlamp 2; 3 is composed of a single type of light source 4; 5. In other words, the light source 4; 5 is preferably exclusively composed of a plurality of opto-electronic elements 11; 12; 13; 14.

If opto-electronic elements with a luminous flux of 5 lm or more are to be efficiently employed, it is desirable to provide the vehicle headlamp with heat-dissipating means. For example, the substrate on which the opto-electronic elements 11; 12; 13; 14 are provided may consist of a metal or a metal alloy. As a result, a good heat conduction from the opto-electronic elements 11; 12; 13; 14 to the substrate is achieved.

In the example shown in FIG. 2, the light source 4; 5 is exclusively composed of a plurality of light-emitting diodes (LEDs). In this example an array of 8×3 LEDs. For identification purposes, in FIG. 2, the rows are indicated by letters A, B, C, and the columns by digits 1–8. By using LEDs or so-called multi-chip packages with a luminous flux in the range from 10–250 lm for blue, yellow/orange, red and green light, the luminous flux of a suitable combination of 25 such elements, or fewer, preferably a combination of 15 such elements, or fewer, for example a combination of 4 such elements meets the internationally standardized and specified intensities for generating the passing beam and/or the main beam, which intensities range between 600 and 1000 lm. The dimensions of a vehicle headlamp 2; 3 having such a relatively small number of opto-electronic elements 11; 12; 13; 14 are comparable to, or much smaller than, the dimensions of a conventional vehicle headlamp.

By using a plurality of opto-electronic elements 11; 12; 13; 14, and by selectively switching on and off a number of opto-electronic elements 11; 12; 13; 14, the light beams generated by the light source 4; 5 can be relatively readily subdivided into one or more beam segments 6, 6'; 7, 7' having a different spatial distribution or substantially different spectral characteristics. The vehicle 1 or the headlamp 2; 3 is preferably provided with means (not shown) for changing the luminous flux of the opto-electronic elements 11; 12; 13; 14 with respect to each other.

In the example shown in FIG. 2, red LEDs are indicated by reference numeral 11, green LEDs by reference numeral 12, blue LEDs by reference numeral 13, and yellow or white LEDs by reference. numeral 14. By ordering the LEDs in the manner indicated in FIG. 2, a substantial reduction of possible color effects is achieved for an observer looking into the light emitted by the vehicle headlamp (for example an oncoming car). In addition, optical systems which effectively mix the colors originating from the LEDs are available. This is important, in particular, to ensure that the red LEDs are not mistakenly taken for brake lights.

The example of the array of LEDs as shown in FIG. 2 represents an integrated module generating at least four types of light beams, namely various light beams which are switched on or off in dependence upon the velocity of the vehicle (sidelamps, passing beam, main beam), light beams which are switched on in dependence upon the rotational position of the steering wheel, light beams for bad weather conditions, and light beams which are specially adapted for use in areas where the intensity of the light is relatively low.

The ordering, providing and selectively switching on and off of opto-electronic elements 11; 12; 13; 14 in the form of an array may also be considered as an invention in itself.

Figure 3A:
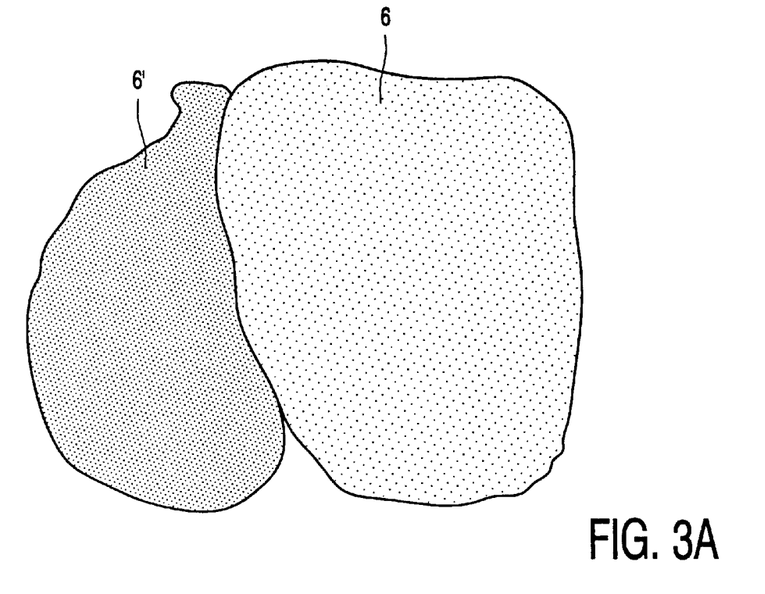
FIG. 3A shows a light beam generated by a first beam segment in combination with a so-called off-axis light beam generated by a second beam segment.

FIG. 3A shows a light beam generated by a first beam segment 6 in combination with a so-called off-axis light beam generated by a second beam segment 6'. The light originating from the beam segments 6, 6' is trapped by the imaginary screen 15 (see FIG. 1B), in which case an observer looks against the longitudinal direction 9. With reference to FIG. 2, the first, so-called on-axis beam segment 6, is generated by light beams originating from LEDs A1–A8 and B3–B5, while the second, so-called off-axis beam segment 6', is generated by light beams originating from LEDs B1, B2, C1 and C2. The other LEDs, as shown in FIG. 2, are switched off under these lighting conditions.

Figure 3B:
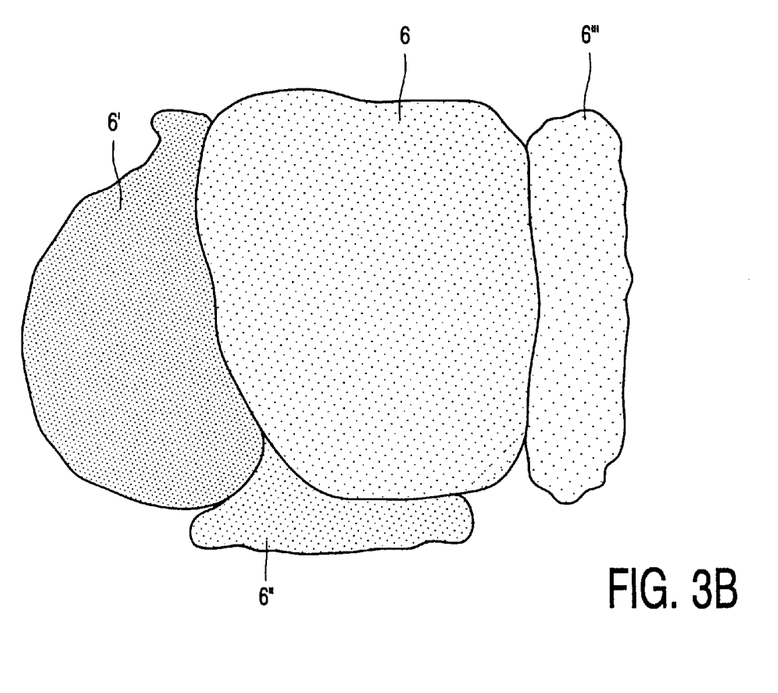
FIG. 3B shows the light beams of FIG. 3A and two additional light beams for improving the on-axis observation conditions.

FIG. 3B not only shows the light beams shown in FIG. 3 but also two additional light beams which predominantly serve to improve the on-axis observation conditions. By additionally switching on the yellow or white LEDs C3–C5, a third beam segment 6" is obtained, and by additionally switching on the yellow or white LEDs B6, C6 and C7, a fourth beam segment 6''' is obtained. The spectral characteristics of the first beam segment 6 and the third and fourth beam segment 6", 6''' may be different. For example, it may be desirable to increase, in the beam segment 6", the quantity of in particular yellow light in order to improve the long-distance visibility. It may also be desirable, upon switching on the main beam (beam segment 6"), to switch off a part of the passing beam (beam segment 6) and/or of the off-axis beam segment 6'.

In order to improve the visibility of the surroundings of the vehicle 1, a substantially different spectral characteristic of the light beam is brought about between the on-axis parts and the off-axis parts of the light beam. In particular, in the off-axis beam segment 6', 7' of the light beam, the spectral characteristic of the light is adapted to a light intensity which is relatively low. To obtain a good observation field at relatively low light intensities, preferably the spectral characteristic of one of the beam segments 6'; 7' is mesotopically tuned. This can be achieved by providing the first beam segment 6; 7 and the third and fourth beam segments 6", 6'''; 7", 7''' with a spectral characteristic which is rich in white or yellow-orange light and by providing the second beam segment 6', 7' with a spectral characteristic which is rich in blue-green light. By thus rendering the spectral characteristic of the light beam generated by the light source dependent upon the position in the light beam, objects situated outside the center of the light beam are better observed.

Figure 4A:
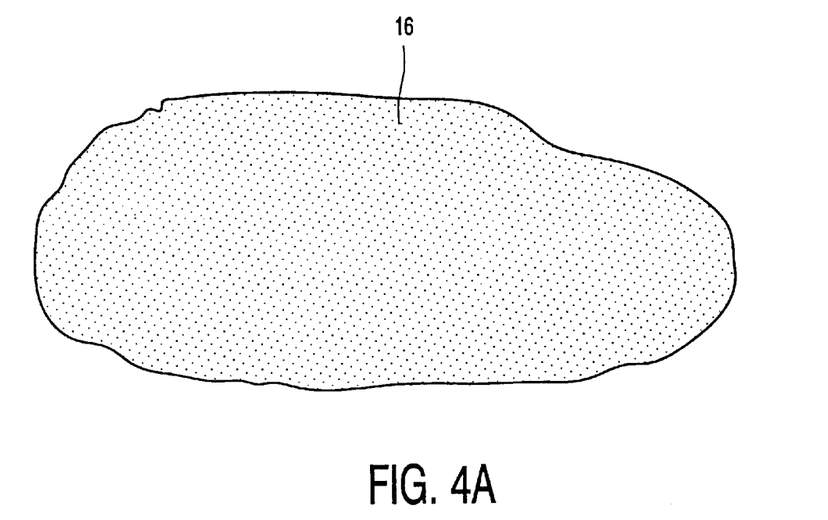
FIG. 4A shows a relatively broad light beam which predominantly consists of yellow light.

Under unfavorable weather conditions, in particular fog and snow, when visibility is reduced by backscattering caused by fog or snow particles, both the configuration and the spectral composition of the light beams generated by the light source 4; 5 can be adapted by activating different combinations of LEDs and by changing the output levels of the various LEDs. As a result of these adaptations, the spatial and/or spectral distribution of the light is changed. An example of such an adaptation is shown in FIG. 4A, wherein a relatively wide beam 16 is obtained which is substantially composed of yellow light. The absence of the blue component in the visible light causes the effect of backscattering to be substantially reduced.

Figure 4B:
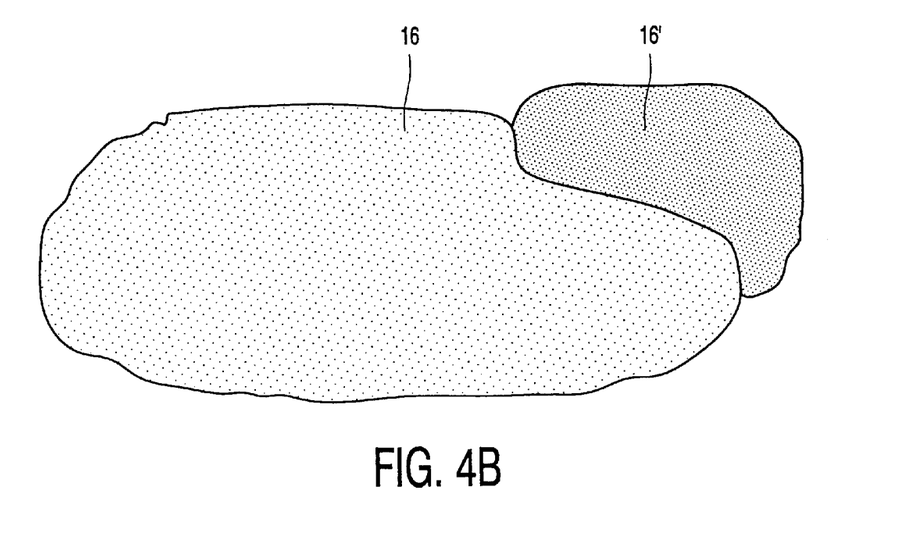
FIG. 4B shows the relatively broad light beam of FIG. 4A in combination with a side light beam dependent upon the position of the steering wheel of the vehicle.

FIG. 4B shows the relatively wide beam 16 of FIG. 4A in combination with a side light beam 16' whose shape and intensity and position are dependent upon the position of the steering wheel of the vehicle 1. Such a side light beam 16' is preferably not switched on until the steering wheel of the vehicle exceeds a predetermined limiting angle when taking a bend or turning off. In this manner, the surface area and space wherein the vehicle is situated and where the vehicle is heading are dynamically illuminated as early as possible.

In general, the LED modules operate at a low-voltage direct current, so that they can be advantageously employed in a vehicle.

It will be obvious that within the scope of the invention many variations are possible to those skilled in the art. For example, the vehicle headlamp may have many different shapes, such as (rect)angular, round, oval, etc. One or more opto-electronic elements may also be suitable for use as indicator. In principle, the dimensions of the light beams are adjustable at will, for example, by creating a broader light beam (illuminating the shoulder of the road) at a lower speed of the vehicle, or by narrowing the beam at a relatively high speed. In addition, as a result of the large freedom of choice resulting from the use of (exclusively) opto-electronic elements, the location of the vehicle headlamp is no longer limited to the conventional location (at the front of the vehicle just above the road surface). It may be desirable to provide at least a part of the opto-electronic elements near the windscreen of the vehicle 1. It is also possible to provide a further part of the opto-electronic elements on a side face of the vehicle. A future increase in the efficiency and light output of the LEDs will enable the number of LEDs to be further reduced.

The scope of protection of the invention is not limited to the above examples. The invention is embodied in each novel characteristic and each combination of characteristics. Reference numerals in the claims do not limit the scope of protection thereof. The use of the term "comprising" does not exclude the presence of elements other than those mentioned in the claims. The use of the word "a" or "an" before an element does not exclude the presence of a plurality of such elements.

What is claimed is:

1. A headlamp of a vehicle comprising a light source which includes a plurality of opto-electronic elements, wherein:

a luminous flux of at least one of the opto-electronic elements amounts, in operation, to at least 5 lm, the opto-electronic elements form an array distributed evenly on a surface of the light source, and a light beam generated by the light source has a continuously adjustable spatial distribution.

2. A vehicle headlamp as claimed in claim 1, wherein the light source consists of a plurality of opto-electronic elements.

3. A vehicle headlamp as claimed in claim 1, wherein the intensities of the light emitted by the opto-electronic elements are adjustable so that the range of said beam varies directly and the width of said beam varies inversely with the velocity of the vehicle.

4. A vehicle headlamp as claimed in claim 1, wherein the intensities of the light emitted by the opto-electronic elements are adjustable so that the spatial distribution of said beam follows the rotational position of a steering wheel of the vehicle.

5. A vehicle headlamp as claimed in claim 1, wherein the intensities of the light emitted by the opto-electronic elements are adjustable to decrease backscattering of said light beam by fog or snow particles in accordance with weather conditions.

6. A vehicle headlamp as claimed in claim 1, wherein the intensities of the light emitted by the opto-electronic elements are adjustable by a driver of the vehicle to control the distribution of said light beam.

7. A vehicle headlamp as claimed in claim 1, wherein the intensities of the light emitted by the opto-electronic elements are varied on said surface of the light source so that the spectral characteristic of said light beam is different at different points in a plane which is transverse to the light beam.

8. A vehicle headlamp as claimed in claim 7, wherein the light beam comprises at least two beam segments, each having a substantially different spectral characteristic from the other.

9. A vehicle headlamp as claimed in claim 8, wherein a first beam segment has a spectral characteristic which is rich in green-yellow light, and a second beam segment has a spectral characteristic which is rich in blue-green light.

10. A vehicle headlamp as claimed in claim 1, wherein the opto-electronic elements comprise light-emitting diodes.

11. A vehicle headlamp as claimed in claim 1, wherein the surface of the light source is curved.

12. A vehicle headlight comprising a light source comprising a plurality of opto-electronic elements , wherein:

the opto-electronic elements form an array on a surface of the light source, said surface having a periphery, said array not being confined to the periphery of said surface, and each said opto-electronic element is adjustable to emit light of variable intensity, whereby a light beam generated by the light source has a continuously adjustable spatial distribution.

13. A headlamp of a vehicle comprising a light source which includes a plurality of opto-electronic elements, wherein the opto-electronic elements are arrayed in columns and rows, and the light emitted by each said opto-electric element is capable of being turned on or off separately, whereby a light source with continuously adjustable spatial distribution is achieved.

14. A vehicle headlamp as claimed in claim 13, wherein the light source consists of a plurality of opto-electronic elements.

15. A vehicle headlamp as claimed in claim 13, wherein the intensities of the light emitted by the opto-electronic elements are varied on said surface of the light source so that the spectral characteristic of said light beam is different at different points in a plane which is transverse to the light beam.

16. A vehicle headlamp as claimed in claim 15, wherein the light beam comprises at least two beam segments, each having a substantially different spectral characteristic from the other.

17. A vehicle headlamp as claimed in claim 16, wherein a first beam segment has a spectral characteristic which is rich in green-yellow light, and a second beam segment has a spectral characteristic which is rich in blue-green light.

18. A vehicle headlamp as claimed in claim 13, wherein the opto-electronic elements comprise light-emitting diodes.

19. A vehicle headlight system comprising:

one or more light sources, each of which comprises a plurality of opto-electronic elements, wherein the opto-electronic elements form an array on a surface of the light source, and the opto-electronic-elements are each adjustable to emit light of varying intensity, whereby light beams generated by the light sources have a continuously adjustable spatial distribution.

20. The vehicle headlight system of claim 19, further comprising a first light source having a first array of opto-electronic elements and a second light source having a second array of opto-electronic elements, said second array being different from said first array.

21. The vehicle headlight system of claim 20, wherein the second array is mirror-inverted with respect to the first array.

22. A headlamp of a vehicle comprising a light source which includes a plurality of opto-electronic elements, wherein:

each said opto-electronic element is adjustable to emit light of variable luminous flux, whereby a light beam generated by the light source has a continuously adjustable spatial distribution.

23. The headlamp of claim 22 wherein the luminous flux of the opto-electronic elements are varied by turning each element on or off.

24. The headlamp of claim 22 wherein the luminous flux of the opto-electronic elements are varied with respect to each other.

* * * * *